Patented Aug. 24, 1943

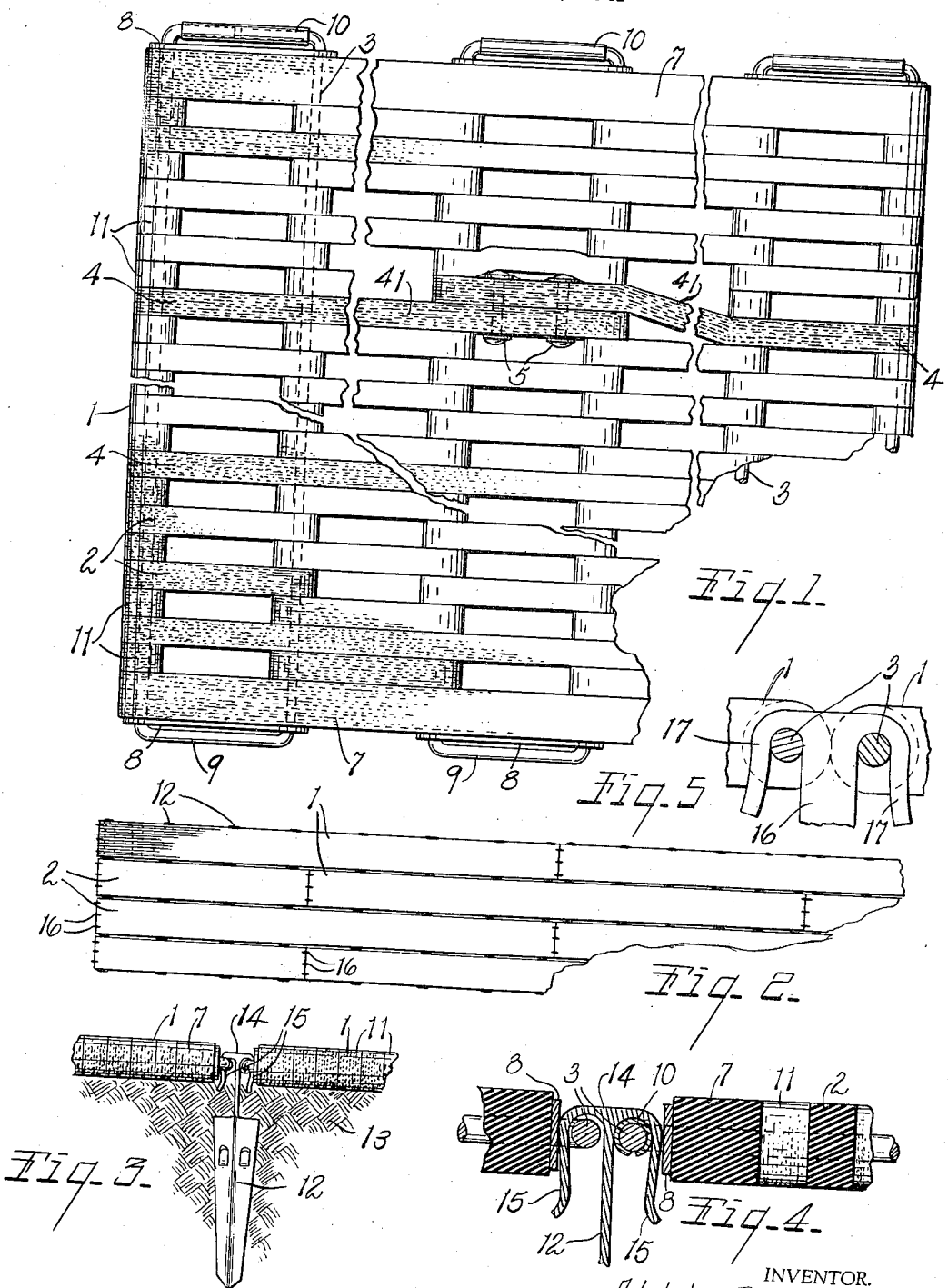

2,327,640

UNITED STATES PATENT OFFICE 2,327,640

SURFACING MAT FOR LANDING FIELDS

Adolph R. Hendry, Portland, Mich.

Application May 29, 1941, Serial No. 395,766

2 Claims. (Cl. 94—30)

The main objects of this invention are:

First, to provide a mat or surfacing unit for emergency landing fields or other substantial areas which is adapted for rendering an area of land of reasonably flat surface suitable as a landing field.

Second, to provide a surface covering of the type described constituted by a plurality of units adapted to be associated with one another in side by side and end to end relation and effectively staked to the ground for use and permitting them to be removed and transported as occasion may require.

Third, to provide an articulated mat unit suitably reinforced or of suitable strength for the purpose described.

Fourth, to provide a structure of the character described in which the individual units may be used for other purposes such, for example, as coverings for the floors of trucks, for the transportation of horses or other animals to prevent their slipping, emergency floors for tents, and the like.

Objects relating to details and economies of the invention will appear from the description to follow. The invention is defined and pointed out in the claims.

A preferred embodiment of the invention is illustrated in the accompanying drawing, in which:

Fig. 1 is a fragmentary plan view of a reinforced articulated mat element embodying the features of the invention and adapted for association with a plurality of similar elements in forming a surface for an emergency landing field or the like.

Fig. 2 is a fragmentary top plan view mainly conventionalized illustrating a plurality of mat units or elements of Fig. 1 associated with one another to constitute a surfacing for a landing field or the like.

Fig. 3 is a fragmentary view in elevation of a section of ground and illustrating the manner of securing the mat units thereto and connecting adjacent units one to another for constituting a surface covering of the desired area.

Fig. 4 is an enlarged fragmentary view in section illustrating further details of the mat unit structure and the anchoring means therefor.

Fig. 5 is a fragmentary view illustrating the manner of anchoring and interconnecting the ends of the mat units.

My present invention relates particularly to an emergency surfacing mat or surface for aircraft landing fields adapted for the use of an army or any other agency to meet the need for rapid preparation of a suitably smooth landing field. My present invention provides such a surfacing structure which is easily and quickly laid on the selected surface, may be taken up and removed with equal facility so that it lends itself admirably to the needs of a mobile army, enabling supplies, reinforcements and the like to be transported thereto by aircraft where reasonably smooth base surfaces are available. Although particularly devised for this purpose, the mat units are likewise well suited to other uses, for example, as a floor surfacing for animal transporting trucks, trailers, and the like to prevent the animals slipping, or for emergency floors for tents and the like.

In a practical embodiment thereof and as I have illustrated in Fig. 2, the mat units are about six feet in width by fifty feet in length and are associated in end to end, side by side relation to constitute the surface of the area desired.

Numeral 1 designates one of the mat units which comprises a plurality of short link-like elements 2 arranged in staggered longitudinal overlapping relation and articulated at the ends thereof by means of the wire connectors 3. The links as a matter of economy are formed of fabric reinforcing tire casing stock although they may be formed of fabric reinforced or laminated rubber stock.

Interspersed with these short links 2 are longitudinal reinforcing tie members or stringers 4 preferably of material similar to that of the links and running the full length of the unit. Where the stock is not of sufficient length for this purpose, sections 41 are spliced together as indicated at 5.

The side members 7 are of similar stock and preferably of somewhat greater thickness than the intermediate stringer members 4.

The tie rods 3 are arranged through the overlapping ends of the members 1, the intermediate longitudinal members 4, and through the side members, these preferably being formed in pairs arranged through the washer or reinforcing plates 8 at the ends and joined together at one end by the integral bight portion 9 and at the other end by the sleeved coupling 10.

Spacers 11 are arranged between the ends of the end links of the unit and the ends of the side and intermediate stringer or longitudinal reinforcing members. The reinforcing members are interspersed in sufficient number to lend the desired strength to the mat.

The link-like members and these longitudinal side and intermediate members are formed of flexible material so that the unit may be rolled up for storage and transportation.

In laying or positioning the units for surfacing a landing field, they are arranged in side by side, end to end relation, as shown in Fig. 2, where the units are shown mainly in conventional form. As a convenient and effective way for anchoring and retaining in position, I provide a plurality of anchor members or stakes 12 formed of metal and adapted to be driven into the ground as indicated at 13 and provided with T-heads 14, the arms 15 of which are adapted to be engaged with the loop-like ends of the tie rods, see Figs. 3 and 4. The ends of the mat are connected by stakes 16 which engage the end tie rods of adjacent units. The links and longitudinal members and the spacers may be forced apart to receive the arms 17 of the anchoring members 16 or they may be shaped to embrace the spacer members.

With the parts thus arranged, a surface reasonably flat may be quickly prepared as a landing field, the units being yieldable in themselves and conformed to the surface especially when subjected to load and the entire assembly is yieldable. The units may be taken up and rolled up for transportation. They are also desirable for use as temporary floors for tents and as mats for use in trucks and the like for the transportation of animals, preventing the animals slipping and the consequent injury thereto.

The structure illustrated embodies my invention in desirable manner.

I have not attempted to illustrate various modifications which I contemplate or which might be desirable for particular uses as it is believed that this disclosure will enable those skilled in the art to embody or adapt my improvements as may be desired.

Having thus described my invention, what I claim as new and desire to secure by Letters Patent, is:

1. A conformable surfacing structure for emergency landing fields or other substantial areas comprising a plurality of flexible, overlapping articulated link units adapted to be disposed in side by side and end to end relation, including transverse tie rods disposed through the overlapped ends of said link-like elements, pairs of said tie rods having connecting portions at their ends, and anchoring stakes of a length many times greater than the thickness of said structure driven into the ground and having T-heads engaging certain of the tie rod end connecting members of adjacent units.

2. An emergency surfacing structure for aircraft landing fields comprising a plurality of articulated link mat units assembled in a requisite number and disposed in end to end and side by side abutting relation to constitute a surfacing structure of desired length and width, and a plurality of stakes of a length many times greater than the thickness of said structure having sharpened ends provided with lateral anchoring offsets, said stakes being driven to the ground in displacement resisting relation thereto and being provided with downturned hook-like elements at the top thereof engageable with the sides of adjacent mat units to hold the same in fixed anchored relation to the ground and one another, there being similar stakes coacting with the ends of adjacent end abutting mat structures for a similar purpose.

ADOLPH R. HENDRY.